Jan. 22, 1929.  1,700,062
B. KOLBER ET AL
SANITARY GLASS ICE CREAM MEASURER
Filed Sept. 2, 1927
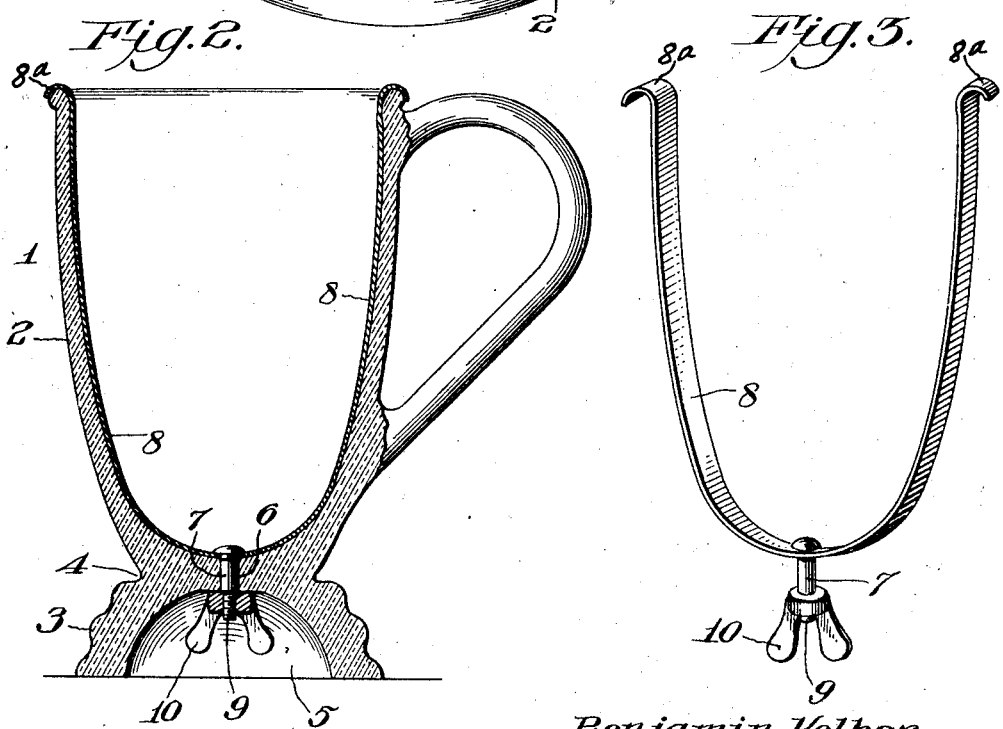
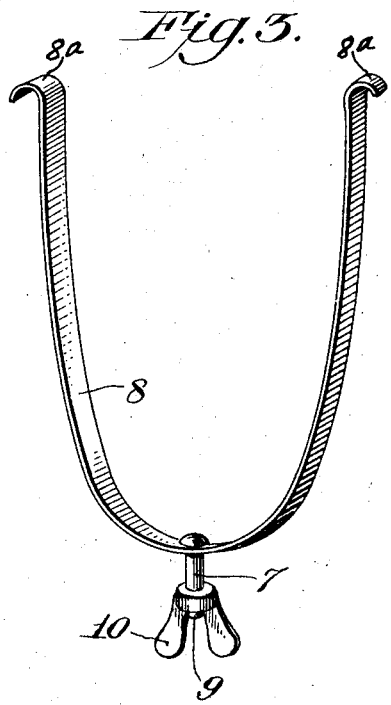
Benjamin Kolber
& Morris Veloric, INVENTORS
BY Victor J. Evans
ATTORNEY
WITNESS:

Patented Jan. 22, 1929.

1,700,062

UNITED STATES PATENT OFFICE.

BENJAMIN KOLBER AND MORRIS VELORIC, OF PHILADELPHIA, PENNSYLVANIA.

SANITARY GLASS ICE-CREAM MEASURER.

Application filed September 2, 1927. Serial No. 217,170.

The present invention relates to an improved sanitary glass ice cream measurer and the purpose of the invention is to provide an article of manufacture of this kind which is very simple, the bowl and the base of the measurer being made integrally in a one piece body including a handle on the body, in combination with a U-shaped cutter conforming to and mounted within the body, so that the arms of the cutter will act to remove the ice cream or other material being measured from the inner surface of the bowl, when the measurer is inverted, allowing the discharge of the contents, it being obvious that the spindle of the cutter is mounted to rotate in the bottom of the bowl, with the handle of the spindle obscured within the hollow of the base, and in this way a very compact form of measure is provided.

Another purpose is to provide a sanitary ice cream measurer wherein the contents is visible through the wall of the measurer, and wherein it is possible to disassemble the cutter and the bowl, so that they can be easily washed and sterilized.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1—is a view in perspective of the improved sanitary glass ice cream measurer constructed in accordance with the invention.

Figure 2—is a vertical sectional view through the same.

Figure 3—is an enlarged detailed view of the cutter detached from the bowl.

Referring to the drawings, 1 identifies the bowl of the improved ice cream measurer, and which may be made of any suitable material, preferably glass, and which comprises the body 2 and the base 3 which are integrally joined as at 4. The bowl may be any shape or size, and constructed through the bottom of the bowl, communicating the interior of the bowl and the hollow 5 of the base, is an opening or passage 6, in which the stem 7 of the cutter 8 is mounted for rotating movement. This spindle or stem 7 is threaded as at 9 for the attachment of a handle 10, by which the cutter may be rotated (the threads 9 being right hand) so that by turning the handle to the right the cutter may be rotated without detaching the handle. However the handle when applied is screwed tightly in place so as to avoid unscrewing the handle provided it might be rotated toward the left.

It is obvious that the contents of the measurer is easily visible through the wall of the bowl, and by detaching the handle from the cutter and removing the latter from the bowl all parts of the measurer can be easily washed and sterilized.

The terminals 8$^a$ of the arms of the cutter 8 are curved and over-lie the marginal bead 2$^a$ at the top of the body 2 of the measurer acting to scrape the ice cream from the bead and further insure sanitation.

The invention having been set forth, what is claimed is:

As an article of manufacture, a sanitary glass ice cream measurer comprising a bowl and a hollow integrally connected base, the cavity of the base being semi-spherical, the bowl being relatively deep on its interior, the bottom of the bowl having a passage communicating with the interior of the base, a U-shaped cutter comprising arms conforming to the interior of the bowl, said cutter having a spindle rotatably extending through the passage and provided with a handle housed within the hollow of the base, the terminals of the arms of the cutter overhanging, conforming to and engaging with the upper marginal edge of the bowl, thereby preventing the arms from springing inwardly from the side of the interior of the bowl, said handle being detachable, whereby the cutter and handle may be removed for cleaning the interior of the bowl and said passage.

In testimony whereof they affix their signatures.

BENJAMIN KOLBER.
MORRIS VELORIC.